March 1, 1938. J. H. BESKOW 2,110,075
AUTO TIRE TUBE VULCANIZER
Filed Sept. 10, 1934
Fig. 1
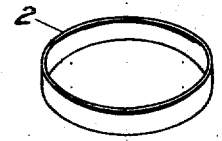
Fig. 2
Fig. 5
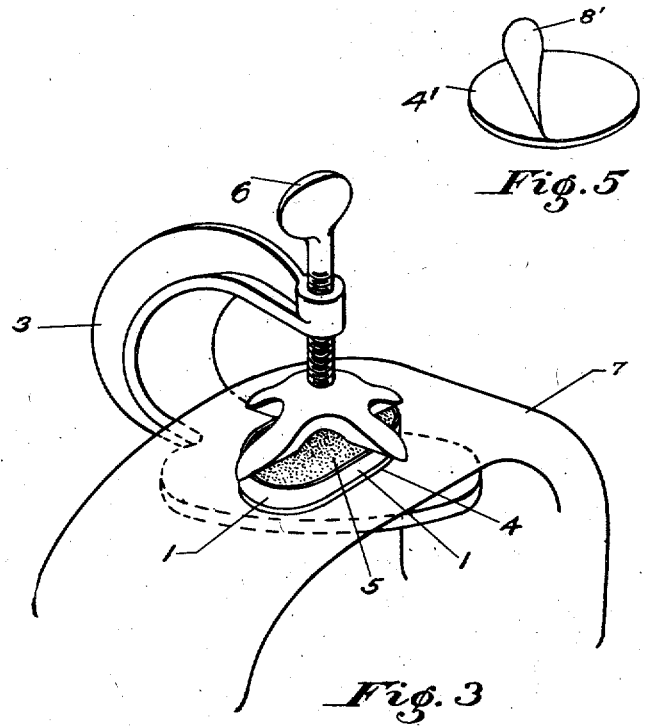
Fig. 3
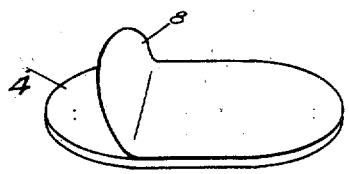
Fig. 4
James H. Beskow
INVENTOR
BY Chas. Denegre
ATTORNEY Patented Mar. 1, 1938

2,110,075

UNITED STATES PATENT OFFICE 2,110,075

AUTO TIRE TUBE VULCANIZER

James H. Beskow, Birmingham, Ala., assignor to Alex Smith, Birmingham, Ala.

Application September 10, 1934, Serial No. 743,352

2 Claims. (Cl. 44—1)

This invention relates to a quick method of vulcanizing punctures in automobile tire tubes, or any other thin rubber that may have a hole in same, such as hot water bags and the like. In other words, it is designed to repair holes in thin rubber without regard to what the rubber may be used for, but it is primarily intended for use to repair punctures in pneumatic tire tubes. I am aware of the fact that there are other vulcanizer combinations on the market, but there are none that have the advantages of my invention. Some of the others are susceptible to dampness, and others are subject to generating too much heat; mine is a happy medium and overcomes the objections that have been made to other vulcanizing outfits.

The invention is made up of a mixture of an inflammable powder to be used in connection with certain mechanical parts. In other words, the powder is only part of the invention, but it is the main part because it produces the right temperature for the purpose intended.

The mechanical features of the invention are illustrated in the accompanying drawing in which Fig. 1 is a perspective view of a small oblong metal pan; Fig. 2 is a perspective view of a small round metal pan; Fig. 3 is a perspective view of the assembled parts consisting of a clamping device; oblong metal pan; inflammable powder in the pan, the patch to be attached to the tube, and part of an automobile tube in place ready for the repair job; Fig. 4 is a perspective view of an ordinary oblong tube patch having a fabric removable back; Fig. 5 is a perspective view of a round patch having a fabric back.

Similar reference numerals refer to similar parts throughout the several views.

The powder combination used as part of the invention consists of the following materials: nitrate of potash, sulphur, coal-coke dust, and what is commonly known as slag dust, the kind of slag referred to being what is poured off as a refuse in manufacturing iron. I have found by experimenting that best results are obtainable from the following combination of the above materials: one hundred pounds of nitrate of potash finely ground with one hundred pounds of coal-coke dust; one hundred fifty pounds of sulphur ground fine with one hundred pounds of slag dust. Then grind together to a fine powder the whole mixture. This mixture produces the best result for inflammable powder, the term powder here meaning the combination of all the elements ground together.

I do not confine my invention to this exact mixture, and reserve the right to vary the quantities of the said materials. For instance, the nitrate of potash may be varied from eighty pounds to one hundred twenty-five pounds; the sulphur may be varied from one hundred fifty pounds to two hundred pounds; the coal-coke dust may be varied from sixty pounds to one hundred twenty pounds; the slag dust may be varied from seventy-five pounds to one hundred five pounds. The small metal parts indicated by Fig. 1 and Fig. 2 are made of 22 gage iron, but this material also may be varied from 14 gage to 30 gage.

When it is desired to repair a puncture in an automobile tube 7 and assuming that you wish to use an oblong patch as shown by Fig. 4, the said patch consisting of rubber 4 with a fabric back 8 is stuck to the bottom of metal pan 1 and then the fabric 8 is pulled off of rubber 4, the face of patch 4 from which fabric 8 has been removed is then placed over the hole in tube 7. Clamp 3 is then so placed that wing screw 6 will press pan 1 tightly against tube 7 having patch 4 between the bottom of the pan and the tube. Then a small amount of powder 5 is placed in pan 1 and the same is lighted by a match or otherwise and allowed to burn out. After standing about three and a half minutes, the clamp is released and pan 1 removed from patch 4 and the vulcanizing of the punctured place is finished. Experimenting with the amount of powder to be used has resulted in arriving at the conclusion that one level teaspoonful produces the most satisfactory results. A little bit more or a little bit less may be used, but for practical purposes a standard amount at all times is best.

Because of the fact that I use a comparatively thin pan and because also my powder does not generate too much heat, the job is more quickly done than where a very thick pan is used in an attempt to kill some of the heat of the powder. Some powders in use generate substantially twice as much heat as my powder.

If the hole to be repaired in the tube is a small one then patch 4' with fabric back 8' is used. In other words in general use there are two kinds of patches, one being oblong and one being round. This does not prevent the use of patches cut in any other shape, the only thing being necessary is that the patch must not be larger than the pan used to vulcanize it onto the tube.

Having described my invention I claim:

1. An inflammable powder for vulcanizing rubber by heat consisting of 100 pounds of potash, 150 pounds of sulphur, 100 pounds of coke, a by-product of soft coal in powder form, 100 pounds of by-product of iron known as slag in powder form, mixed together.

2. An inflammable mixture in powdered form of substantially equal quantities of nitrate of potash, sulphur, coke, a by-product of soft coal and by-product of iron known as slag for generating heat by burning for vulcanizing purposes.

JAMES H. BESKOW.